United States Patent [19]
DeMoss et al.

[11] Patent Number: 5,251,940
[45] Date of Patent: Oct. 12, 1993

[54] PIPE COUPLING WITH PIVOTING LOCKING MEMBER

[75] Inventors: Ronald D. DeMoss; Paul J. E. Fournier, both of Jackson, Mich.

[73] Assignee: Aeroquip Corporation, Maumee, Ohio

[21] Appl. No.: 812,049

[22] Filed: Dec. 23, 1991

[51] Int. Cl.$^5$ ............................................. F16L 15/00
[52] U.S. Cl. ...................................... 285/87; 285/320; 285/330
[58] Field of Search ............... 285/87, 85, 88, 320, 285/330; 251/149.9; 137/614.05, 614.06

[56] References Cited

U.S. PATENT DOCUMENTS

| | | | |
|---|---|---|---|
| 320,939 | 6/1885 | Longmore | 285/87 |
| 459,951 | 9/1891 | Warner | 285/87 |
| 2,765,183 | 10/1956 | Mahoney | 285/87 |
| 2,948,553 | 8/1960 | Gill et al. | 137/614.02 |
| 3,159,180 | 12/1964 | Courtot et al. | 137/614.06 |
| 4,438,779 | 3/1984 | Allread . | |
| 4,511,152 | 4/1985 | Fournier . | |
| 4,643,459 | 2/1987 | Carson | 285/85 |
| 4,648,630 | 3/1987 | Bruch | 285/87 |
| 5,099,883 | 3/1992 | Maiville | 137/614.06 |

Primary Examiner—Eric K. Nicholson
Attorney, Agent, or Firm—Emch, Schaffer, Schaub & Porcello Co.

[57] ABSTRACT

A pipe coupling is disclosed. The coupling includes a pair of hub members and a pair of coupling members surrounding the hub members. A plurality of projections extend outwardly from the coupling member and are received in receiving recesses in the other coupling members. Relative rotation of the coupling members moves the projections behind locking flanges into a locking position. A pivotally mounted lever on each connecting member is received by a locking recess on the other connecting member when in the locking position.

10 Claims, 3 Drawing Sheets

PIPE COUPLING WITH PIVOTING LOCKING MEMBER

BACKGROUND OF THE INVENTION

Fluid couplings are known in the art and are used to connect ends of flexible hose and also are used to connect pipe. The present invention is a fluid coupling and more specifically a pipe coupling which is designed to quickly connect and disconnect plastic pipe. However, the pipe connection according to the present invention may also be use in connection with other types of pipe, such as cast iron pipe or in connection with flexible hose.

A prior art coupling is disclosed in U.S. Pat. No. 4,438,779, which patent is owned by the assignee of the present invention.

Preferably a pipe coupling must be readily assembled and must provide a fluid tight fitting.

It is also preferable if the coupling halves are interchangeable. Non interchangeable fluid couplings present problems.

The primary object of the present invention is to provide an improved pipe coupling having interchangeable coupling halves.

Another object of the invention is to provide a coupling which is movable to an automatic lock position.

Still another object of the invention is to provide a coupling which swivels or rotates independently, while being connected, allowing ease of assembly in the field.

SUMMARY OF THE INVENTION

The present invention comprises a fluid coupling and more particularly a pipe coupling which includes a pair of hub members and a pair of coupling members. Each of the connecting members surrounds one of the hub members. The connecting members have a plurality of outwardly extending projections and also define recesses adjacent the projections. A circumferentially extending lock flange is defined by the respective connecting members adjacent the receiving recesses. The receiving recesses of respective connecting members receive the projections of the other one of the connecting members. Relative rotation of the connecting members move the projections into a locking position behind respective ones of the lock flanges. Locking means are provided for securing the pair of coupling members one to another when the pipe coupling is moved to the locked position.

DESCRIPTION OF THE PREFERRED EMBODIMENTS

Figure 3:
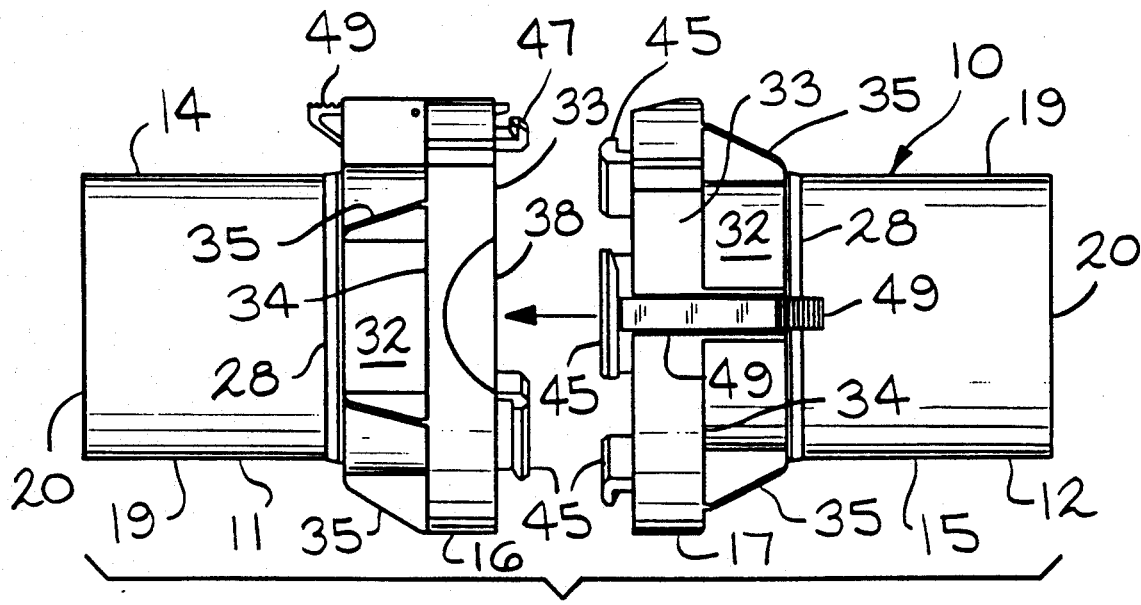
FIG. 3 is an exploded view of the two halves of a pipe coupling, according to the present invention being moved toward one another.
Figure 4:
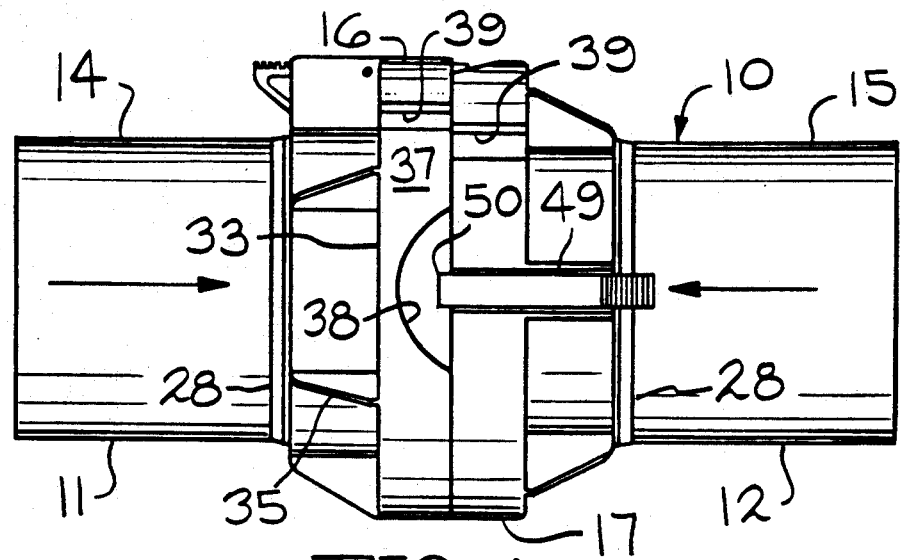
FIG. 4 is a view similar to FIG. 3 showing the two halves after initial contact.
Figure 9:
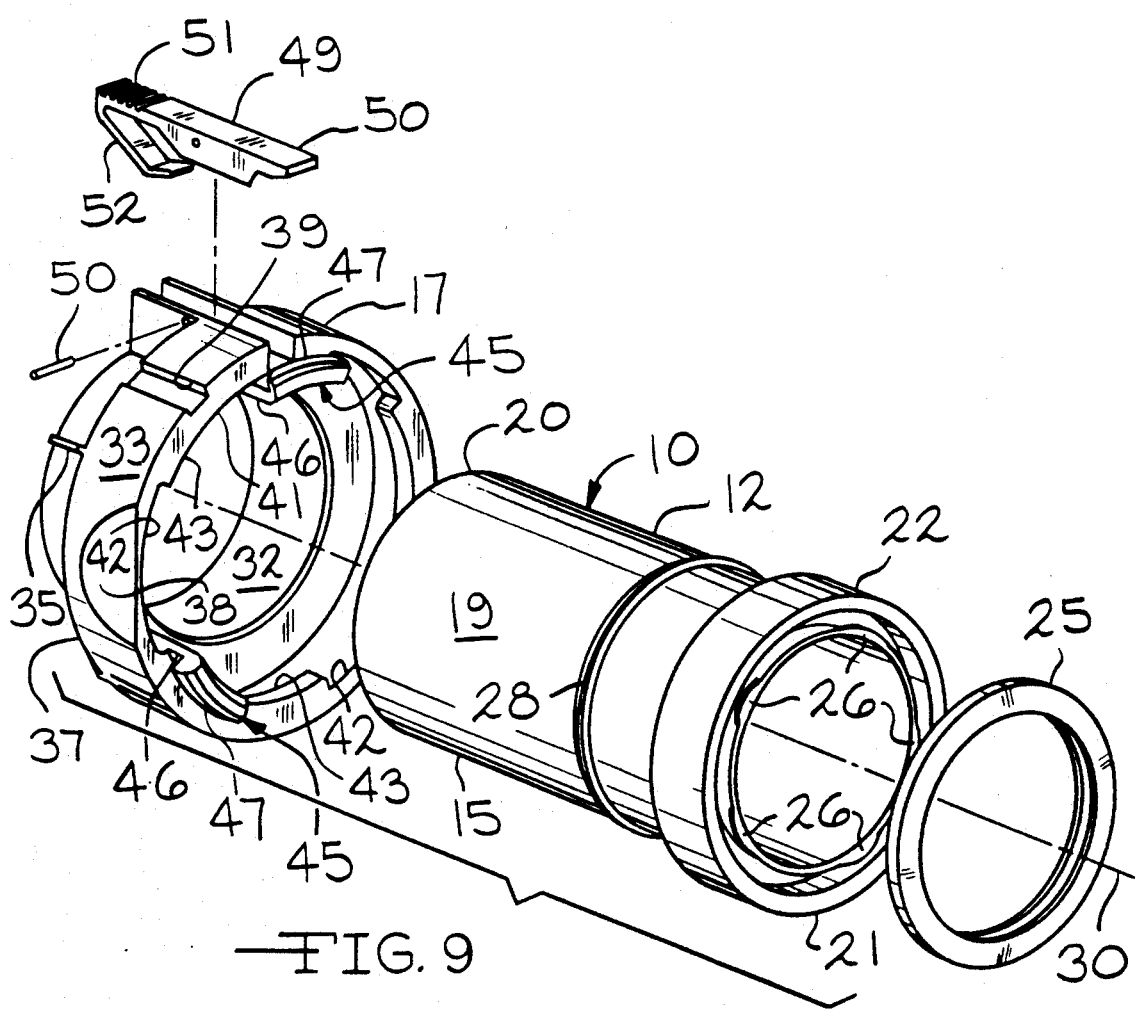
FIG. 9 is an exploded perspective view showing one half of a pipe connection, according to the present invention.

Referring to the drawings, a pipe coupling, according to the present invention, is generally indicated by the reference number 10. The pipe coupling 10 includes two connector halves 11 and 12. The coupling halves 11 and 12 are interchangeable with the components preferably being the same. The pipe coupling 10 includes a pair of hub members 14 and 15 and a pair of coupling members 16 and 17. While other materials can be utilized, polyphenylene sulfide is a preferred material for the coupling members 16 and 17 and polyethylene is a preferred material for the hub members 14 and 15. The connecting member 16 is concentric with the hub member 14 and surrounds the hub member 14. Similarly, the connecting member 17 surrounds the hub member 15. Referring to FIGS. 3 and 9, the hub members 14 and 15 include a cylindrical body 19 having a pipe end 20 and a coupling end 21. A circular flange 22 is integrally affixed to the cylindrical body 19 adjacent the coupling end 21. The circular flange 22 defines a circular seal recess 24 which receives a pressure activated face seal 25. Preferably a plurality of radially extending lobes 26 are defined by the circular flange 22 and act to retain the face seal 25 within the seal recess 24. The face seal 25 can be constructed of neoprene or other suitable seal materials. A preferred embodiment of the face seal 25 is disclosed in U.S. Pat. No. 4,511,152, which disclosure is incorporated herein by reference.

A circular bead 28 is positioned on the exterior of the cylindrical body 19 in spaced relationship to the flange 22. The circular bead 28 serves as a stop to retard relative axial movement along a longitudinal axis 30 between the hub members 14, 15 and their surrounding connecting members 16, 17.

Figure 2:
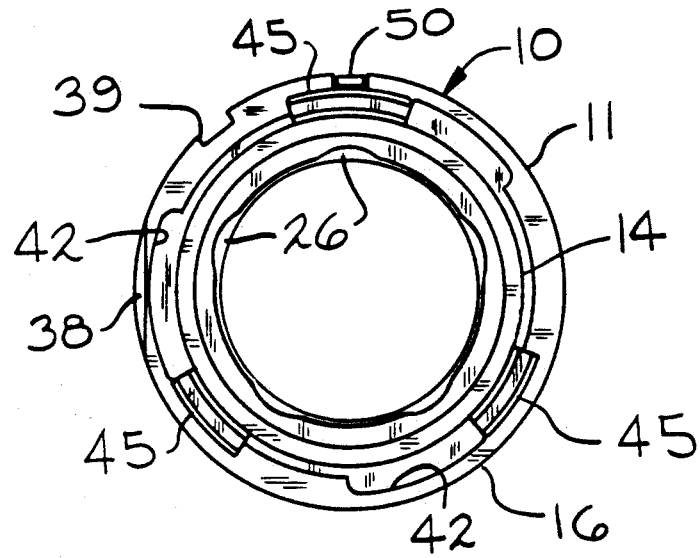
FIG. 2 is an enlarged sectional view of a pipe coupling, according to the present invention, taken along the line 2—2 of FIG. 1.

Referring to FIGS. 2, 3 and 9 the connecting members 16 and 17 include center sleeves 32 which surround the hub members 14 and 15. The connecting members 16 and 17 also include concentric ring members 33 which are joined to the center sleeves 32 by integral wall members 34. In the preferred embodiment, integral reinforcing ribs 35 extend between the wall member 34 and the center sleeve 32. The concentric ring member 33 has an outer surface 37 which defines both a ramp surface 38 and an axial locking recess 39. Referring to FIG. 9, a circular lip 41 extends inwardly from the outer surface 37 of the ring member 33. The circular lip defines a plurality of circumferentially spaced receiving recesses 42. The lip 41 also defines a plurality of circumferentially spaced lock flanges 43 adjacent the recesses 42.

Referring to FIG. 9, a plurality of projections 45 extend outward from the ring member 33. In the present embodiment, the projections 45 are integral with the bottom of the circular lip 41. In the present embodiment, the projections 45 are generally "L" shape and include a base 46 extending outwardly from the lip 41 and an outwardly extending lug 47.

In the present embodiment, a pivotally mounted locking level 49 is mounted within each locking recess 39 by a pivot pin 50. The locking lever 49 includes a lock end 50 and an activating end 51. In the present embodiment, the locking lever 49 includes an integral spring arm 52 which engages the bottom of the axial locking recess 39 for urging the lock end 50 of the locking lever 49 toward the locked position, shown in FIG. 8. In the embodiment the integral material of the spring 52 provides the spring characteristics. However, in other embodiments other types of springs can be utilized and still fall within the scope of the present invention. In the locked position, the lock end 50 extends across and into an aligned locking recess 39 of the second connecting member to retard relative rotation between the connecting members 16, 17.

Figure 1:
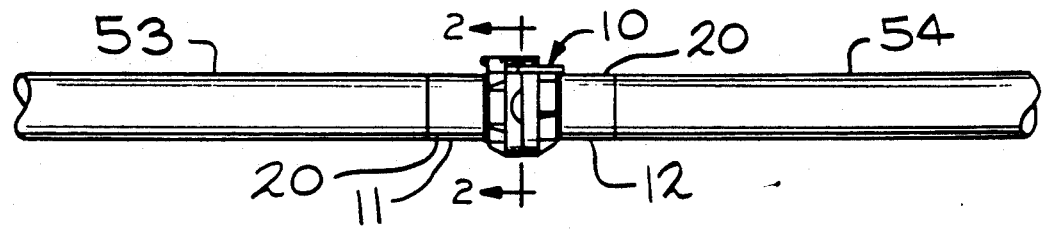
FIG. 1 is a fragmentary plan view of pipes which have been joined together with a pipe coupling, according to the present invention.

Referring to FIG. 1, the pipe coupling 10, according to the present invention, is connected to pipes 53 and 54. In the present embodiment, the pipes 53 and 54 are plastic pipes and the pipe ends 20 of the respective coupling halves 11 and 12 are ultrasonically welded to the ends of the pipes 53 and 54. Other types of connections can also be used for plastic pipe and various other types of pipes.

Because the coupling halves 11 and 12 are interchangeable, the pipe coupling 10, according to the present invention, eliminates inconvenience that is present in many prior art pipe couplings. As shown, particularly in FIG. 3, the present pipe coupling 10 utilizes a limited number of parts which are easily joined together.

As discussed further below, the automatic locking feature and the manual unlocking feature of the pipe coupling 10 provides a relatively safe pipe coupling by tending to prevent unintentional disconnections. In addition, because the connecting members 16 and 17 are relatively rotatable with respect to the hub members 14 and 15, the pipe coupling 10, according to the present invention, provides excellent swivel characteristics for ease of connection and disconnection in the field.

Referring to the drawings, and particularly to FIGS. 3-6, during connection of the pipe coupling 10, the opposed coupling halves 11 and 12 are aligned so that locking levers 49 are initially positioned adjacent the ramp surfaces 38. When in the FIG. 3 position, the projections 45 on one of the coupling halves 11, 12 are aligned and can be received by the receiving recesses 42 on the other one of the coupling halves 11, 12. The projections 45 are then moved into the receiving recesses 42 to place the coupling halves 11 and 12 into the position shown in FIG. 4. The arrows indicate the direction of movement of the two connecting halves 11, 12.

Figure 5:
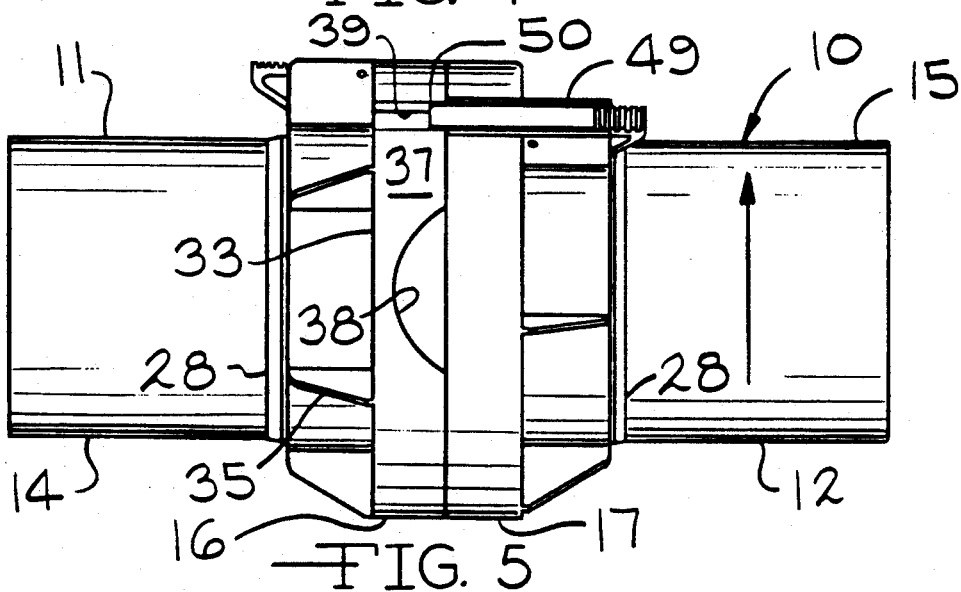
FIG. 5 is a view similar to FIG. 3 showing the two halves during relative rotation.
Figure 6:
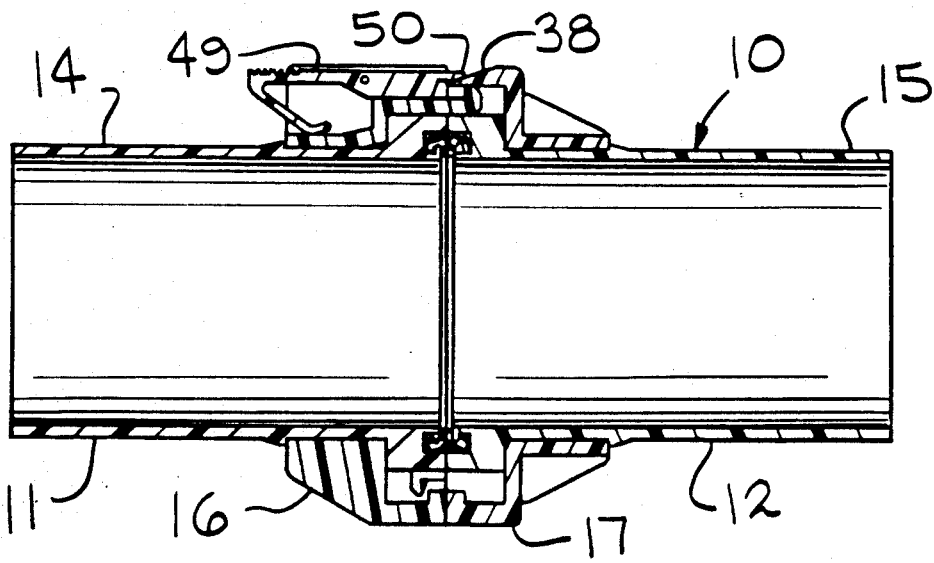
FIG. 6 is a longitudinal cross-sectional view of the pipe coupling.
Figure 7:
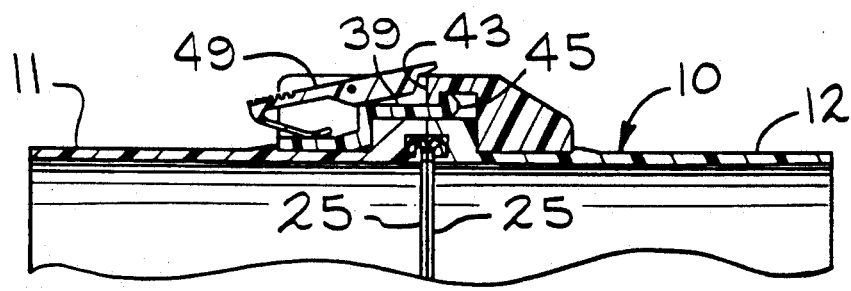
FIG. 7 is fragmentary cross-sectional view showing the locking lever in an unlocked or disengaged position.
Figure 8:
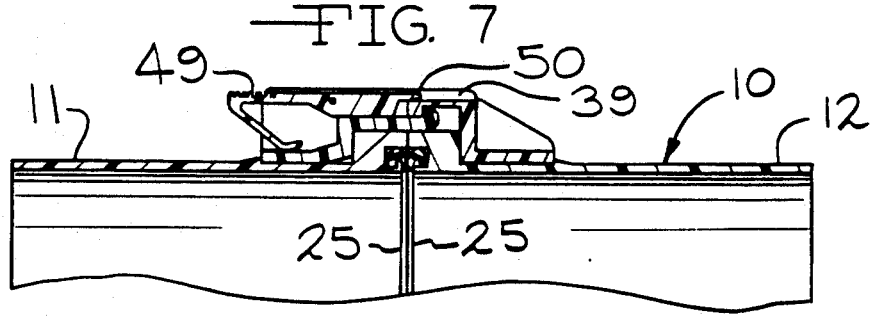
FIG. 8 is a view similar to FIG. 7 showing the locking lever in the locked position.

Referring to FIG. 5, the connecting member 17 is then rotated relative to the connecting member 16. This moves the lock ends 50 of the locking levers 49 out of the respective ramp surfaces 38. The lock ends 50 are moved along the respective outer surfaces 37 of the ring members 33 toward respective ones of the axial locking recesses 39. As the locking ends 50 are moved toward the locking recesses 39, the lugs 47 of the projections 45 are moved behind respective ones of the lock flanges 43 of the circular lip 41 of the ring members 33. When the locking levers 49 are rotated sufficiently, the spring biased lock ends 50 are moved into the now aligned axial locking recesses 39 and the lugs 47 of the projections 45 are secured behind their respective lock flanges 43 to secure the pipe coupling 10 in the locked position as shown in FIG. 8.

To disconnect, the above procedure is reversed. The activating ends 51 of the locking levers 49 are pushed to overcome the spring pressure and to move the lock ends 50 out of the aligned locking recesses 39 in the ring members 33. The connecting members 16 and 17 may then be rotated to move the projection lugs 47 from behind the lock flanges 43. When the projections 45 are rotated sufficiently to align the lugs 47 with the receiving recesses 42, the connecting members 16 and 17 may be moved axially away from one another to the FIG. 3 position.

Many revisions may be made to the above described embodiments without departing from the scope of the invention or from the following claims.

We claim:

1. A pipe coupling comprising, in combination, a pair of hub members, a pair of connecting members, each of said connecting members surrounding one of said hub members, each of said connecting members having a plurality of outwardly extending projections, said connecting members defining receiving recesses adjacent said projections, a circumferentially extending lock flange defined by said connecting member adjacent each of said receiving recesses, whereby said receiving recesses of each of said connecting members receive said projections of the other one of said connecting members and wherein relative rotation of said connecting members move said projections into a locking position adjacent respective ones of said lock flanges and locking means for releasably securing said pair of connecting members to one another, said locking means including a pivotally mounted locking lever mounted on each of said connecting members and axial locking recesses on the other one of said connecting members, said locking lever including spring means for urging said locking lever toward the locked position, whereby said locking lever is movable between a locked position and an unlocked position, said locking lever being received by a respective locking recess when in the locked position.

2. A pipe coupling, according to claim 1, wherein said connecting member is rotatable relative to said hub member.

3. A pipe coupling, according to claim 1, wherein said spring means comprises an integral spring arm.

4. A pipe coupling, according to claim 1, wherein each of said connecting members includes a center sleeve surrounding said one of said hub members, a concentric ring member and a wall member extending between said center sleeve and said concentric ring member, said ring member having an outer surface defining said axial locking recesses, said outer surface defining a ramp surface for guiding a mating locking lever during initial movement toward such locked position.

5. A pipe coupling, according to claim 4, including reinforcing ribs on each of said connecting members extending between said wall member and said center sleeve.

6. A pipe coupling, according to claim 1, including a circular stop on said hub member, wherein said stop retards relative axial movement between said hub member and said surrounding connecting member.

7. A pipe coupling, according to claim 1, wherein said hub includes a circular flange, said flange defining a circular seal recess and a face seal mounted within said seal recess.

8. A pipe coupling, according to claim 7, and a plurality of lobes defined by said circular flange adjacent said seal recess, said lobes acting to retain said face seal within said seal recess.

9. A pipe coupling, according to claim 1, wherein said projections comprise generally "L" shaped members having a base and an outwardly extending lug, said connecting members including a concentric ring member, a circular lip extending inwardly from said ring member, said lip defining said lock flanges, said ring member and said lip defining said receiving recesses, wherein when said connecting members are rotated into said locking position said lugs are positioned behind said lock flanges.

10. A pipe coupling comprising, in combination, a pair of hub members, a pair of connecting members, each of said connecting members surrounding one of said hub members, said connecting member including a concentric ring member, a plurality of projections extending outwardly from said ring member, each of said projections including an outwardly directed lug adjacent an outer end, a circular lip extending inwardly from said ring member, said lip defining a plurality of receiving recesses and a plurality of lock flanges, whereby said recesses of each of said connecting members receive said projections of the other one of said connecting members and wherein relative rotation of said connecting members move said projections into a locking position wherein a respective lug is positioned behind a locking flange, a locking assembly for releasably securing said pair of connecting members including a pivotally mounted locking lever mounted on each of said connecting members and axial locking recesses on the other one of said connecting members, said locking lever including spring means for urging said locking lever toward the locked position, whereby said locking lever is movable between a locked position and an unlocked position, said locking lever being received by a respective locking recess when in the locked position.

* * * * *